(12) United States Patent
Shu et al.

(10) Patent No.: US 10,178,144 B1
(45) Date of Patent: Jan. 8, 2019

(54) SCATTERING AUDIO STREAMS

(71) Applicant: MARVELL INTERNATIONAL LTD., Hamilton (BM)

(72) Inventors: Biing Long Shu, Singapore (SG); Dehuan Meng, Beijing (CN); Donald Pannell, Cupertino, CA (US); Fei Wu, Beijing (CN)

(73) Assignee: MARVELL INTERNATIONAL LTD., Hamilton (BM)

( * ) Notice: Subject to any disclaimer, the term of this patent is extended or adjusted under 35 U.S.C. 154(b) by 56 days.

(21) Appl. No.: 15/378,960

(22) Filed: Dec. 14, 2016

Related U.S. Application Data

(60) Provisional application No. 62/267,030, filed on Dec. 14, 2015.

(51) Int. Cl.
*H04L 29/06* (2006.01)

(52) U.S. Cl.
CPC ................... *H04L 65/607* (2013.01)

(58) Field of Classification Search
None
See application file for complete search history.

(56) References Cited

U.S. PATENT DOCUMENTS

| | | | | |
|---|---|---|---|---|
| 6,044,089 A * | 3/2000 | Ferriere | ................ | H04L 29/06 348/E5.008 |
| 6,160,953 A * | 12/2000 | Fuchigami | ....... | G11B 20/10527 386/339 |
| 6,539,210 B1 * | 3/2003 | Heredia | ................ | H03J 1/0075 455/154.1 |
| 6,760,323 B1 * | 7/2004 | Strandberg | .......... | H04L 12/4604 370/352 |
| 7,047,305 B1 * | 5/2006 | Brooks | ............. | H04L 29/06027 348/207.99 |
| 8,103,507 B2 * | 1/2012 | Sagen | ............ | H04N 21/234309 704/257 |
| 8,868,222 B2 * | 10/2014 | Egi | ..................... | H04L 43/0835 381/58 |
| 2007/0230435 A1 * | 10/2007 | Anzai | .................... | H04L 47/15 370/351 |
| 2007/0299983 A1 * | 12/2007 | Brothers | .............. | H04N 21/233 709/231 |
| 2014/0257813 A1 * | 9/2014 | Mortensen | .............. | G10L 15/02 704/251 |
| 2014/0297292 A1 * | 10/2014 | Marko | .................... | G10L 19/00 704/500 |
| 2017/0287500 A1 * | 10/2017 | De Mers | ................ | G10L 21/028 |
| 2018/0068665 A1 * | 3/2018 | Marko | ................... | H04H 60/58 |

* cited by examiner

*Primary Examiner* — Steven H Nguyen

(57) ABSTRACT

Aspects of the disclosure provide a method for scattering audio streams. The method can include receiving a set of audio data transmission signals indicating a format of audio data, determining a set of format parameters corresponding to the format of the audio data based on the set of audio data transmission signals, determining whether the set of format parameters are different from a set of previously determined format parameters, searching a lookup table for a build entry identified by the set of format parameters when the set of format parameters are different from the set of previously determined format parameters, and generating a media packet carrying audio samples of the audio data according to the build entry.

20 Claims, 5 Drawing Sheets

| 411 | 412 | 421 | 422 | 423 | 424 | 425 | 426 INPUT AUDIO CHANNEL INDEX NUMBER | | | | | | | |
|---|---|---|---|---|---|---|---|---|---|---|---|---|---|---|
| SAMPLING RATE | BIT CLOCK NUMBER PER SAMPLING PERIOD | DESTINATION ADDRESS | FLOW ID | CHANNEL SECTION NUMBER | MEDIA FORMAT | SAMPLE BIT-WIDTH | CHANNEL SECTION | | | | | | | |
| | | | | | | | #1 | #2 | #3 | #4 | #5 | #6 | #7 | #8 |
| 48 KHz | 256 | ADDRESS OF DESTINATION DEVICE 161a | XXX | 8 | AM824 | 24 BITS | 1 | 2 | 3 | 4 | 5 | 6 | 7 | 8 |
| 44.1 KHz | 64 | ADDRESS OF DESTINATION DEVICE 161b | YYY | 2 | AAF | 32 BITS | 1 | 2 | | | | | | |

*FIG. 4*

SCATTERING AUDIO STREAMS

INCORPORATION BY REFERENCE

This present disclosure claims the benefit of U.S. Provisional Application No. 62/267,030, "Rate-Dependent Digital Audio Scattering" filed on Dec. 14, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An Ethernet network can operate according to Audio Video Bridging (AVB) standards to stream time-synchronized audio and video with low latency. The AVB-enabled network may include a source device and a destination device. The source device encapsulates samples of a media stream in packets and transmits the packets to the destination device.

SUMMARY

Aspects of the disclosure provide a method for scattering audio streams. The method can include receiving a set of audio data transmission signals indicating a format of audio data, determining a set of format parameters corresponding to the format of the audio data based on the set of audio data transmission signals, determining whether the set of format parameters are different from a set of previously determined format parameters, searching a lookup table for a build entry identified by the set of format parameters when the set of format parameters are different from the set of previously determined format parameters, and generating a media packet carrying audio samples of the audio data according to the build entry.

In one embodiment, the set of format parameters corresponding to the format of the audio data includes a sampling rate of the audio data, and a number of bits transmitted during a sampling period in the set of audio data transmission signals. In another embodiment, the set of audio data transmission signals indicating the format of the audio data includes a frame clock signal indicating a sampling rate of the audio data, and a bit clock signal indicating a number of bits transmitted during a sampling period of the audio data.

In one example, the build entry includes a destination address for transmitting the media packet to a destination device, and generating the media packet includes including the destination address in the media packet for transmitting the media packet to the destination device at the destination address. In one example, the build entry includes a flow identifier (ID) indicating a media packet flow transmitted to a destination device, and generating the media packet includes including the flow ID in the media packet.

In one example, the build entry includes information specifying a stream format for content in a payload of the media packet, and generating the media packet includes generating the payload of the media packet according to the stream format. In another example, the build entry includes information specifying a number of channel sections in the media packet and an audio sample bit-width of samples carried in the media packet. In a further example, the build entry includes information specifying a subset of audio channels of the audio data and a subset of channel sections in the media packet for carrying audio samples of the subset of audio channels respectively, and generating the media packet includes including the audio samples of the subset of audio channels of the audio data in the respective channel sections in the media packet.

Aspects of the disclosure provide a circuit for scattering audio streams. The circuit can include a memory configured to store a lookup table including one or more build entries, and a format monitor circuit configured to receive a set of audio data transmission signals indicating a format of audio data, determine a set of format parameters corresponding to the format of the audio data based on the set of audio data transmission signals, and determine whether the set of determined format parameters are different from a set of previously determined format parameters. The circuit can further include a searching unit circuit configured to search the lookup table for a build entry identified by the set of format parameters when the set of determined format parameters are different from the set of previously determined format parameters, and a packet generator circuit configured to generate a media packet carrying audio samples of the audio data according to the build entry.

Aspects of the disclosure provide a device for scattering audio streams. The device can include a memory configured to store a lookup table including one or more build entries, and a format monitor circuit configured to receive a set of audio data transmission signals indicating a format of audio data, determine a set of format parameters corresponding to the format of the audio data based on the set of audio data transmission signals, and determine whether the set of determined format parameters are different from a set of previously determined format parameters. The device can further include a searching unit circuit configured to search the lookup table for a build entry identified by the set of format parameters when the set of determined format parameters are different from the set of previously determined format parameters, a packet generator circuit configured to generate a media packet carrying audio samples of the audio data according to the build entry, a switch unit configured to transmit the media packet to a destination device, and a central processing unit (CPU) configured to execute program instructions to configure the lookup table.

BRIEF DESCRIPTION OF THE DRAWINGS

Various embodiments of this disclosure that are proposed as examples will be described in detail with reference to the following figures, wherein like numerals reference like elements, and wherein:

FIG. 4 shows a lookup table according to an embodiment of the disclosure.

DETAILED DESCRIPTION OF EMBODIMENTS

Figure 1:
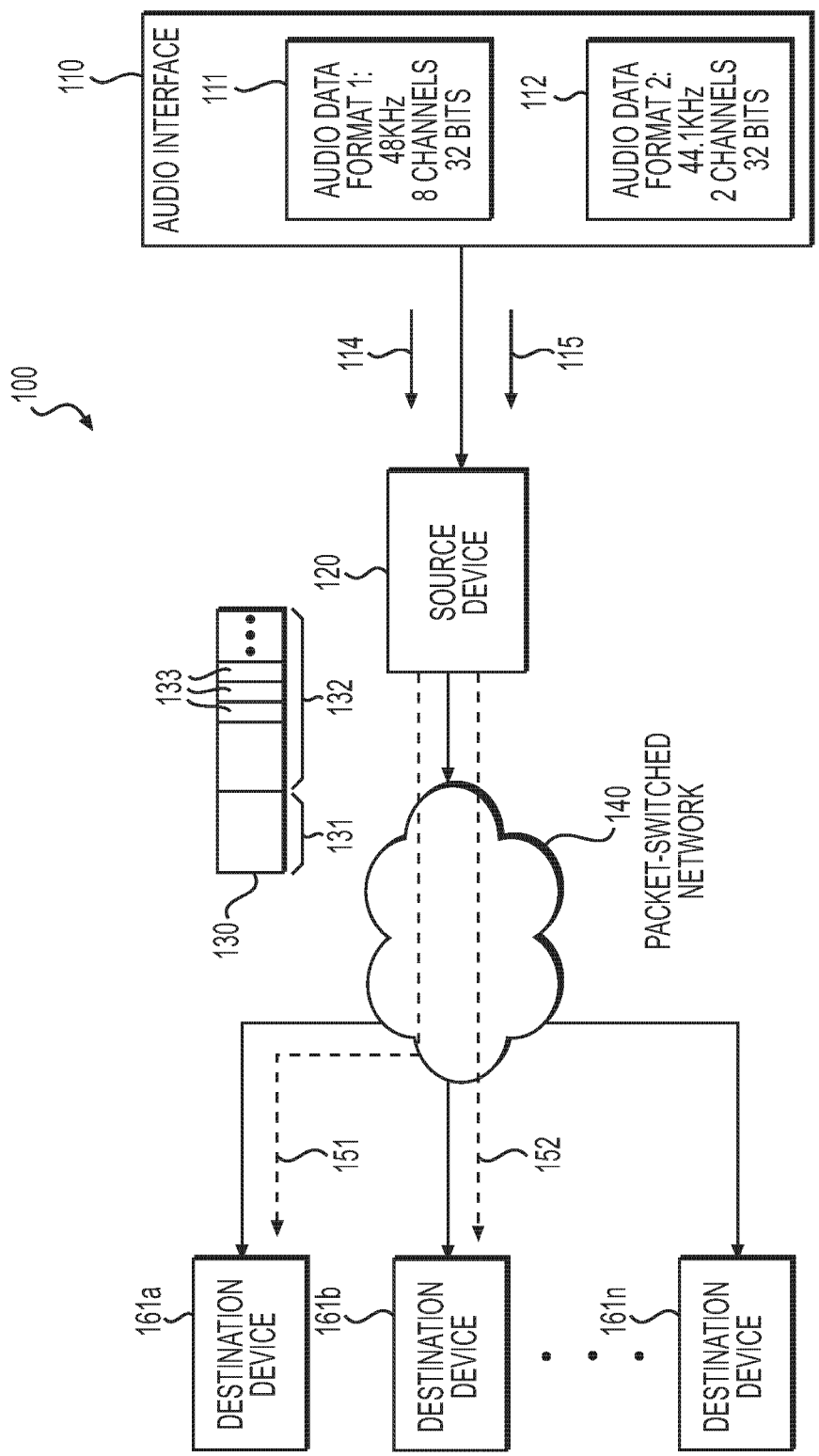
FIG. 1 shows a media-streaming network according to an embodiment of the disclosure.

FIG. 1 shows a media-streaming network 100 according to an embodiment of the disclosure. The media-streaming network 100 includes a source device 120, a packet-switched network 140, and multiple destination devices 161a-161n. The source device 120 receives audio data 114 from an audio interface 110, and transmits one or more media streams to a subset of the multiple destination devices 161a-161n. Each media stream includes a flow of media packets carrying the audio data 114. The subset of destination devices 161a-161n receive the media streams, obtain audio data from the media packets, and subsequently play the audio data to speakers connected to the respective destination devices.

According to an aspect of the disclosure, the source device 120 can monitor a format of the received audio data 114, and scatter media streams to different subsets of destination devices 161a-161n when the format of the received audio data 114 changes. For example, in FIG. 1, the source device 120 initially receives audio data 114 having a first format 111 from the audio interface 110. In the illustrated example, the audio data 114 of the first format 111 has a sampling rate of 48 KHz, and includes 8 audio channels. Samples in the audio data 114 have a bit-width of 32 bits. While receiving audio data 114, the source device 120 transmits a media stream 151 carrying the audio data 114 of the first format 111 to the destination device 161a. Thereafter, the audio interface 110 switches to transmit audio data 114 having a second format 112, and the source device 120 accordingly starts to receive audio data 114 of the second format 112. In the illustrated example, the audio data 114 having the second format 112 has a sampling rate of 44.1 KHz, and 2 audio channels. The bit-width of each sample is still 32 bits. The source device 120 can detect the change of the audio data format, and accordingly stop transmitting the media stream 151 and start to transmit another media stream 152 that carries audio data 114 of the second format 112 to the destination device 161b.

The source device 120 receives the audio data 114 by receiving a set of audio data transmission signals 115 carrying the audio data 114. The transmission signals 115 can have a certain structure or format. The format of the audio data 114 can be determined based on the structure of the received transmission signals 115. Accordingly, the source device 120 can monitor the transmission signals 115 to monitor the format change of the audio data 114.

The audio interface 110 receives audio data from various audio sources, such as microphones, computers, media player devices, multi-media websites on the Internet, and the like. For example, the audio interface 110 may be employed at a performance venue to receive audio data generated from multiple microphones. Each microphone generates a channel of audio data with a certain sampling rate. In other examples, the audio interface 110 may receive audio data from a DVD or CD player device. A DVD video player may generate AC-3 format audio data which can include 6 channels with a 48 KHz sampling rate. A CD player may generate audio data including two channels with a 44.1 KHz sampling rate. In other examples, the audio interface 110 may receive analog signals from microphones, and accordingly the audio interface 110 can include analog-to-digital converters to convert the analog input to digital audio data.

In one example, the audio interface 110 includes an audio output interface (not shown). Based on a configuration of audio data formats, the audio output interface selects a subset of input audio channels, adjusts sampling rates and bit-widths of audio samples, and subsequently generates the transmission signals for carrying the selected audio data 114. Multiple audio data formats can be configured, and a user can control the audio interface 110 to transmit audio data 114 with different audio data format at different times.

The audio output interface at the audio interface 110 cooperates with an audio input interface (not shown) at the source device 120 to transmit the transmission signals 115. In various examples, the audio output interface and the audio input interface can communicate based on certain communication protocols or standards, such as Inter-IC Sound (IIS) standard, time division multiplexed (TDM) audio interface, and the like. Accordingly, the transmission signals 115 have a format or structure specified by respective protocols or standards.

While receiving the audio data 114, the source device 120 encapsulates audio samples in the received audio data 114 to generate media packets. A media packet 130 is shown in FIG. 1 as an example of the generated media packets. In one example, the media packet 130 is formed according to IEEE 1722 AVBTP standard, thus being referred to as a 1722 packet. The media packet 130 includes a header section 131 and a payload section 132. The header section 131 can include a field carrying a destination address associated with one or more destination devices 161a-161n for routing the media packet 130 to the respective destination devices. In one example, the header section 131 can further include a field carrying an indicator indicating a media format. The media format refers to structure of content carried in the payload section 132. In some examples, a media format is specified by a communication standard. For example, AM824 media format is one of multiple media formats specified by the IEC 61883 Consumer audio/video equipment—Digital interface standard. AVTP Audio Format (AAF) is another media format specified by the IEEE-1722 AVB Transport Protocol (AVBTP) standard.

The payload section 132 carries content formed according to a media format. The payload section 132 can include multiple data blocks 133, referred to as channel sections 133, each carrying audio samples from an audio channel. For example, the source device 120 receives audio data 114 from the audio interface 110 that includes 8 audio channels. Accordingly, 8 channel sections 133 can be employed to carry audio samples of the 8 audio channels, respectively. In one example, the number of channel sections 133 is larger than that of audio channels to be transmitted.

In addition, the source device 120 generates media packets according to a lookup table (also referred to as a build list). In one example, the lookup table includes multiple build entries. Each build entry specifies a set of packet generation parameters for generating a media packet. For example, the packet build parameters can include a destination address for transmitting the media packet, a flow ID identifying a stream of media packets, a channel section number indicating how many channel sections are included in a payload of the media packet, a media format indicating a format of content in the payload, and a sample bit-width indicating a bit-width of audio samples carried in the media packet. In addition, the packet build parameters can further include channel mapping information. The channel mapping information specifies which channel sections in the media packet carry audio samples of which audio channels of the audio data 114 received from the audio interface 110.

In one example, each build entry in the lookup table is identified by a set of format parameters. A set of format parameters are determined according to a format of audio data 114. When audio data 114 with different formats is received at the source device 120, different set of format parameters can be determined. Thus, a set of format parameters are associated with an audio data format, and hence can be used to indicate audio data 114 having the respective audio data format.

During a media packet generating process, the source device 120 first determines a set of format parameters based on received transmission signals 115. Then, the source device 120 searches the lookup table with the set of determined format parameters to find a build entry having the same set of format parameters. Subsequently, the source device 120 generates media packets according to the build entry. For example, different build entries may include different destination addresses for transmitting the media packets. Consequently, audio data 114 with different formats may be encapsulated into media packets with different destination addresses and thus being transmitted to different destination devices 161a-161n.

The packet-switched network 140 can be the Internet, a mobile network, a wireless or wired local area network (LAN), and the like. In some examples, the packet-switched network 140 is capable of transmitting time sensitive media data with low latency and low packet loss. For example, the packet-switched network 140 can provide mechanisms for reserving bandwidths for time sensitive media streams and guarantee a high level of quality of service (QoS) for transmission of the media streams. In one example, the packet-switched network 140 is an Ethernet network implementing the IEEE 802.1Qat Stream Reservation Protocol (SRP) standard and the IEEE 802.1Qav Queuing and Forwarding Protocol standard to guarantee the QoS for transmission of media streams.

The destination devices 161a-161n receives media streams from the source device 120, obtain audio data carried in media packets and play audio data to speakers connected to respective destination devices.

It is noted that each source device in the media-streaming network 100 can include suitable components such that the source device can function as a destination device, and similarly each destination device in the media-streaming network 100 can include suitable components such that the destination device can function as a source device. In addition, the media-streaming network 100 can include other source devices (not shown) in addition to the source device 120.

Figure 2:
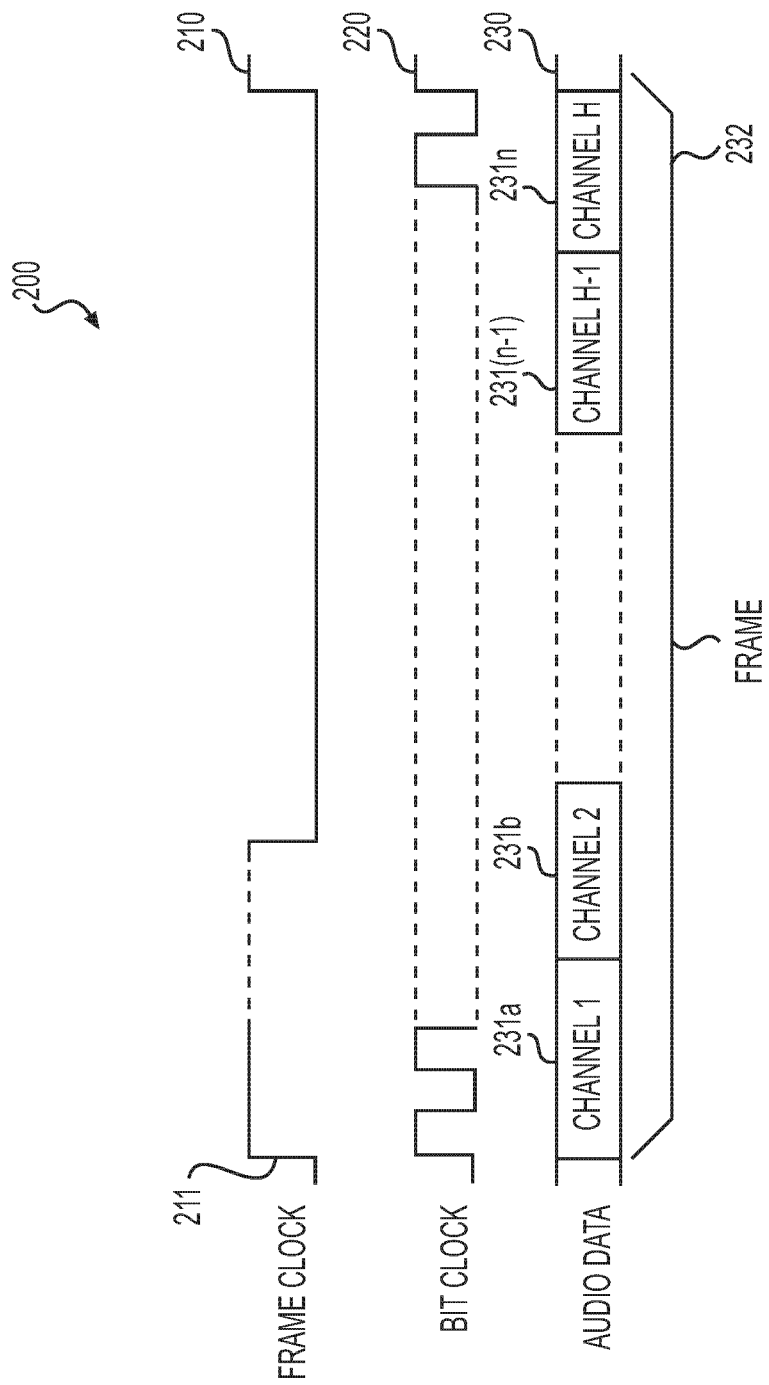
FIG. 2 shows a set of audio data transmission signals according to an embodiment of the disclosure.

FIG. 2 shows a set of audio data transmission signals 200 according to an embodiment of the disclosure. The set of transmission signals 200 is an example of the transmission signals 115, and is generated based on time division multiplexing (TDM) method. The transmission signals 200 include a frame clock signal 210, a bit clock signal 220, and an audio data signal 230 transmitted via three transmission lines. The frame clock signal 210 indicates a start of an audio data frame carried by the audio data signal 230, for example, with a rising edge 211 of the frame clock signal 210. The frame clock signal 210 has a frequency, referred to as a frame rate, equal to a sampling rate of audio data transmitted by the transmission signals 200. The bit clock signal 220 pulses once for each discrete bit of audio data carried by the audio data signal 230. The frame clock signal 210 and the bit clock signal 220 provide control signals to synchronize operations of two TDM interfaces for transmission and reception of the transmission signals 200.

The audio data signal 230 includes a sequence of audio data frames. FIG. 2 shows an audio data frame 232 as one example of the sequence of audio data frames. The audio data frame 232 includes multiple channel blocks 231a-231n. Each channel block corresponds to an audio channel of input audio data, and carries an audio sample of the audio channel. Accordingly, each channel block can be associated with an audio channel index number representing the respective audio channel of the audio data 114. For example, the channel block 231a carries an audio sample of an audio channel, Channel 1, while the channel block 231n carries an audio sample of an audio channel, Channel N. The number of bits within the audio data frame 232 equals the product of the number of channel blocks 231a-231n and the bit-width of the audio sample in each channel block. Each audio data frame lasts for a sampling period. As described, the bit clock signal 220 pulses once for each discrete bit of audio data. Thus, the number of bits within a frame can be determined by detecting the number of pulses of the bit clock signal 220 during a sampling period.

Based on the structure of the transmission signals 200, a set of format parameters indicating a format of audio data 114 transmitted by the transmission signals 200 can be determined. For example, when audio data having a format of 48 KHz sampling rate, 8 audio channels, and 32 bits sample bit-width is transmitted on the transmission signals 200, the frame rate of the frame clock signal 210 would be 48 KHz, and the number of bits per frame would be 8×32=256 bits which equals the number of pulses of the bit clock signal 220 during a sampling period. Accordingly, by detecting the frame clock signal 210 and the bit clock signal 220, the sampling rate of the audio data can be determined to be 48 KHz, and the number of bits during a sampling period can be determined to be 256 bits. While when audio data having a format of 44.1 KHz sampling rate, 2 audio channels, and 32 bits sample bit-width is transmitted using the transmission signals 200, the frame rate of the frame clock signal 210 would be 44.1 KHz, and the number of bits per frame would be 2×32=64 bits which equals the number of pulses of the bit clock signal 220 during a sampling period. Accordingly, by detecting the frame clock signal 210 and the bit clock signal 220, the sampling rate of the audio data can be determined to be 44.1 KHz, and the number of bits during a sampling period can be determined to be 64 bits.

It can be seen that different values of sampling rate and bit numbers per sampling period can be determined for audio data 114 with different formats. Thus, in one example, the sampling rate and the number of bits during a sampling period (also referred to as a bit clock number per sampling rate) are used as a set of format parameters for indicating a format of audio data 114 transmitted by the transmission signals 200.

Figure 3:
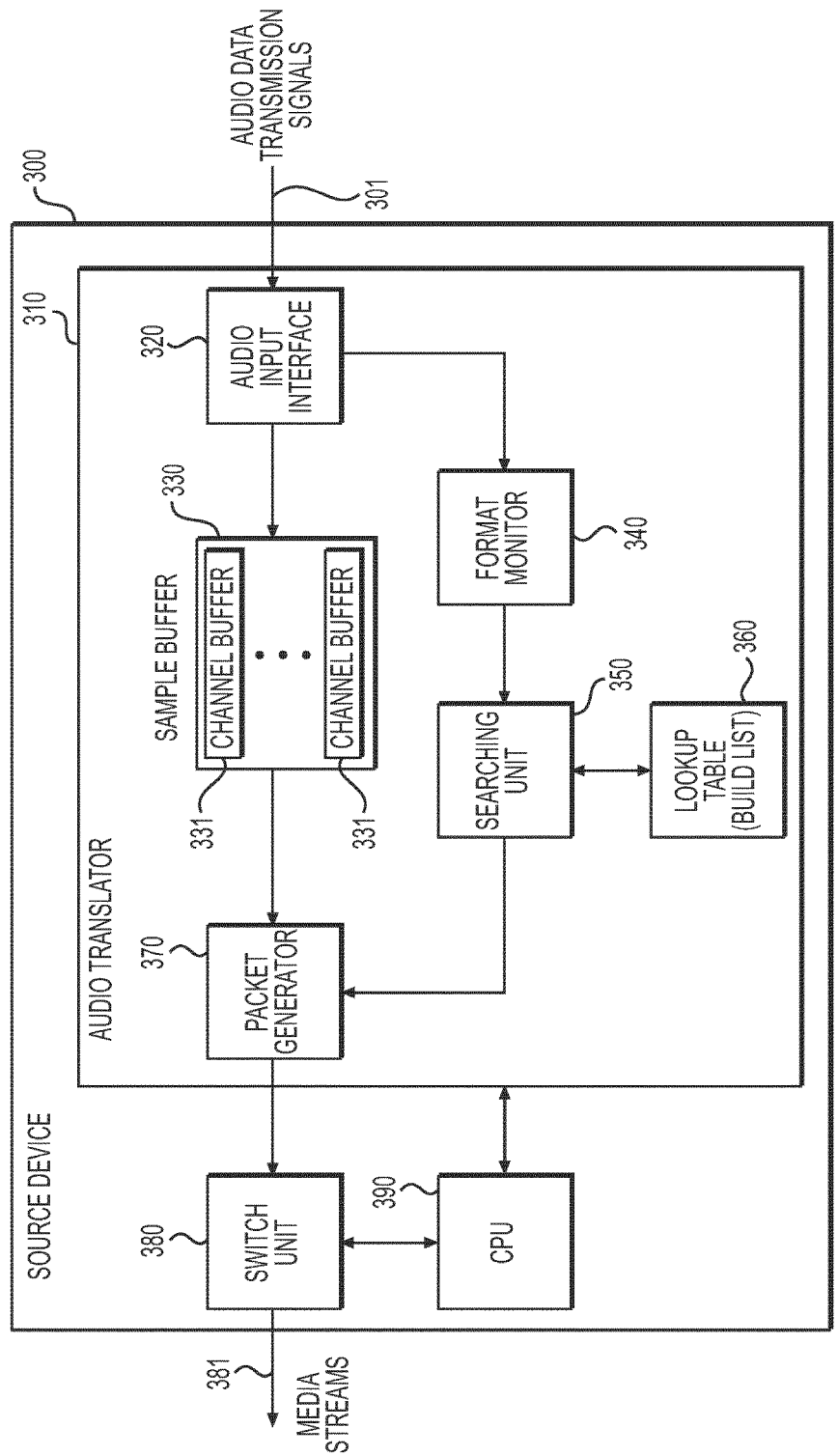
FIG. 3 shows a source device according to an embodiment of the disclosure.

FIG. 3 shows a source device 300 according to an embodiment of the disclosure. The source device 300 receives audio data (referred to as input audio data) carried by a set of audio data transmission signals 301 and transmits one or more media streams 381 carrying the input audio data to a set of destination devices. The source device 300 includes an audio translator 310, a witch unit 380, and a central processing unit (CPU) 390 in one example. Those components are coupled together as shown in FIG. 3.

The audio translator 310 receives the set of audio data transmission signals 301 as input, and generates packets as output according to the transmission signals 301. During this process, audio samples in a form of a serial TDM signal are transformed to a stream of media packets carrying the audio samples. In other words, audio data is transformed from a TDM domain to a packet-switched domain. In one example, the audio translator 310 includes an audio input interface 320, a format monitor 340, a searching unit 350, a lookup table 360, a sample buffer 330, and a packet generator 370. Those components are coupled together as shown in FIG. 3.

In one example, the audio input interface 320 forward a copy or part of the received transmission signals 301 to the format monitor 340. In addition, the audio input interface 320 receives the transmission signals 301 and obtain data samples from the transmission signals 301. As described, the transmission signals 301 can include an audio data signal carrying multiple channels of audio samples. The audio input interface 320 extracts these audio samples and store the audio samples to the sample buffer 330.

The sample buffer 330 is a memory for storing the audio samples carried by the transmission signals. In one example, the sample buffer 330 is configured to include multiple memory blocks 331, referred to as channel buffers 331, each for storing audio samples of an audio channel. For example, input audio data may include 8 audio channels. Accordingly, the sample buffer 330 is configured to include 8 channel buffers each storing audio samples of one of the 8 audio channels.

In one example, the format monitor 340 receives the transmission signals 301 from the audio input interface 320, and determines a set of format parameters according to the transmission signals 301. The set of format parameters corresponds to a format of input audio data. In one example, the set of format parameters includes a sampling rate and a bit clock number per sampling period.

In one example, the transmission signals 301 include a frame clock signal, and the format monitor 340 includes a local time reference which may be synchronized with that of an audio interface that generates the transmission signals 301. Based on the local time reference and the frame clock signal, a sampling rate equal to frame rate of the frame clock signal can be determined. In addition, the transmission signals 301 can further include a bit clock signal, and the format monitor 340 can further include a counter for counting a number of pulses in the bit clock signal. By controlling the counter with the frame clock signal, a bit clock number per sampling period (per frame) can be determined. After the set of format parameters are determined, the format monitor 340 transmits the determined format parameters to the searching unit 350.

In one example, the format monitor 340 is configured to monitor the format of input audio data. For example, when a transmission of the transmission signals 301 is initiated, the format monitor 340 can determine a first set of format parameters, and transmits the first set of format parameters to the searching unit 350. The searching unit 350 can then function according to the first set of format parameters. At the same time, the format monitor 340 may store a copy of the first set of format parameter at a local memory.

Thereafter, the format monitor 340 may periodically perform operations of determining a set of format parameters based on received transmission signals 301, and compare thus determined format parameters with the stored first set of format parameters. If no change takes place, the format monitor 340 will not send another set of format parameters to the searching unit 350. Once a format of input audio data changes, a second set of format parameters different from the first set of format parameters can be determined. The format monitor 340 can detect the change of the format parameters, and send the second set of format parameters to the searching unit 350. Accordingly, the searching unit 350 will function based on the second set of format parameters.

The searching unit 350 receives a set of format parameters from the format monitor 340, and, as a response, determines a build entry according to the set of format parameters. Specifically, in one example, the searching unit 350 searches the lookup table 360 with the set of format parameters for a build entry identified by the set of format parameters. If such a build entry is found, the searching unit 350 obtains a set of packet generation parameters included in the build entry and passes the set of packet generation parameters to the packet generator 370. For example, the searching unit 350 may store the set of packet generation parameters to a memory which can be visited by the packet generator 370. If no entry identified by the set of format parameters is found, in one example, the searching unit 350 may transmit a signal to the packet generator 370 to subsequently pause packet generation operations.

In one example, the lookup table 360, also referred to as a build list, includes multiple build entries. Each build entry can be associated with a set of format parameters. For example, each build entry may include one or more sections for storing a set of format parameters. Those format parameters stored in a respective build entry can be used to identify the respective build entry. In addition, each build entry can include a set of packet generation parameters, such as a destination address, a flow ID, a number of channel sections, a media format, a sample bit-width, channel mapping information, and the like. Those packet generation parameters specify how a media packet can be built accordingly at the packet generator 370.

In one example, multiple build entries can be associated with one set of format parameters. For example, in order to transfer audio samples in input audio data with a certain format to multiple destination devices, multiple build entries can be configured in the lookup table 360. The multiple build entries may use a same set of format parameters for identifying the multiple build entries, however, each of the multiple build entries may include different generation parameters, such as different destination addresses. During a search process, the searching unit 350 can obtain the multiple build entries with one set of format parameters. Accordingly, based on the multiple build entries, the packet generator 370 can generate media packets with different formats or destination addresses for the input audio data, and transmit the media packets to different destination devices.

The packet generator 370 generates media packets according to a set of packet generation parameters received from the search unit 350. For example, based on the set of packet generation parameters, a packet format, a destination address, a number of channel sections, or which audio samples being contained in which channel section can be determined for packet generation operation. In one example, based on mapping information in a build entry, the packet generator 370 can select a subset of channel buffers 331 at the sample buffer 330 and transfers the respective audio samples to respective channel sections in a media packet. After the media packets are generated, the packet generator 370 transmits the media packets to the switch unit 380.

In one example, the switch unit 380 receives media packets from the packet generator 370, and forwards the media packets to destination devices (not shown) according to a destination address carried in the media packets. Media packets with different destination addresses may form different packet streams 381. In one example, media packets may carry a flow ID, and accordingly the switch unit 380 may process the media packets based on the flow ID before the forwarding operation. The switch unit 380 can include multiple ports connected with components inside the source device 300 or network nodes in the media-streaming network 100. In one example, the switch unit 380 includes a forwarding table that can be configured to forward media packets to different output ports of the switch unit 380 according to destination addresses in media packets. In one example, the switch unit 380 is implemented as an Ethernet switch.

The CPU 390 executes program instructions stored in a memory (not shown) to perform various functions of the source device 300. For example, the CPU may execute code instructions implementing various communication protocols. For another example, a user can configure the audio translator 310 (for example, update the lookup table 360) through an interface program running on the CPU 390. In some examples, the CPU 390 may perform part of functions of the audio translator 310, such as monitoring input audio data, determining a build entry, and the like. However, in other examples, the functions of the audio translator 310 are implemented with circuitry separate from the CPU 390, thus reducing operation burden of the CPU 390 and improving performance of the source device 300.

In various examples, the audio translator 310 can be implemented with any suitable hardware, software, or combination thereof. In one example, the audio translator 310 is implemented with one or more integrated circuits, such as application-specific integrated circuits (ASICs), field programmable gate arrays (FPGAs), and the like. In another example, part of the components of the audio translator 310 is implemented as software, such as program instructions stored in a memory executable by a processor. In a further example, the CPU 390, the switch unit 380 and the audio translator 310 are implemented in one integrated circuit.

FIG. 4 shows an example lookup table 400 according to an embodiment of the disclosure. The lookup table 400 includes multiple build entries, such as the build entries 430 and 440. As shown, each build entry includes two set of fields for storing two types of information. A first set of fields 411 and 412 are used for storing a set of format parameters that are used to identify the respective build entry. Specifically, the field 411 stores a sampling rate parameter, while the field 412 stores a parameter of bit clock number per sampling period. For example, the sampling rate parameter can have a value of 44.1 KHz, 48 KHz, 88.2 KHz, 96 Khz, and the like, while the bit clock number per sampling period can have a value of 32, 64, 128, or 256 bits.

The second set of fields 421-426 are used for storing packet generation parameters that are used for media packet generation operations at the packet generator 370. Specifically, the field 421 stores a destination address, the field 422 stores a flow ID, the field 423 stores a channel section number, the field 424 stores a media format, the field 425 stores a sample bit-width, and the field 426 stores channel mapping information. For example, the channel section number can take a value of 8, 16, 32, or 64. The media format can be AM824 or AAF. The sample bit-width can take value of 32, 24, 20, or 16 bits.

The field 426 storing the channel mapping information can further includes multiple sub-fields. Each sub-field corresponds to a channel section in a media packet, and stores an audio channel index number representing an audio channel of input audio data. In this way, based on the channel mapping information of the field 426, the packet generator 370 can determine audio samples of which input audio channel are stored to which channel sections in a media packet when generating the media packet.

In some examples, however, it is possible that not all channel sections in a media packet are assigned with an input audio channel, and not all input audio channels are mapped to a channel section. For example, the channel mapping information can specify a subset of input audio channels and a subset of channel sections, and maps the subset of input audio channels to the subset of channel sections. Accordingly, in one example, for channel sections that are not occupied, a sequence of zeros can be filled to the respective channel sections by the packet generator 370.

As an example, the build entry 461 includes a sampling rate of 48 KHz and a bit clock number per sampling rate of 256. When input audio data having a format of 48 KHz sampling rate, 8 audio channels, and a 32 bit sample bit-width is received at the audio translator 310, a set of format parameters that match the values in the fields 411 and 412 of the build entry 431 can be determined at the format monitor 340. As a result, the build entry 461 is selected by the searching unit 350, and respective packet generation parameters are passed to the packet generator 370. Accordingly, the packet generator 370 starts to generate media packets according to the packet generation parameters.

For example, according to the fields 421 and 422 of the build entry 461, an address of the destination device 161*a* and a flow ID XXX are included in a media packet. According to the field 423, 8 channel sections are included in the payload of the media packet. According to the field 424, the media format AM824 is adopted to generate content in the payload. According to the field 425, sample bit-width of audio samples carried in the media packet is reduced to 24 bits from the original 32 bits. According to the field of 426, the 8 input audio channels are mapped to the 8 channel sections of the media packet, respectively.

As another example, based on the build entry 462, when input audio data with a format of 44.1 KHz sampling rate, 2 audio channels and 32 bit sample bit-width is received at the audio translator 310, the packet generator 370 generates media packets having the following property: using an address of the destination device 161*b* as a destination address, including a flow ID of YYY, including 2 channel sections, payload content having a media format of AAF, having a sample bit-width of 32 bits, and mapping the two input audio channels in the two channel sections.

It is noted that lookup tables in various examples may have structures or field values different from the FIG. 4 example. For example, format parameters other than sampling rate or bit clock number per sampling period can be employed to indicate an audio data format or to identify a build entry. A build entry in other lookup tables may include different type of packet generation parameters. Number of packet generation parameters in other lookup tables may be fewer or larger than that of the lookup table 400. In addition, input audio channels can be mapped to channel sections in any order.

Figure 5:
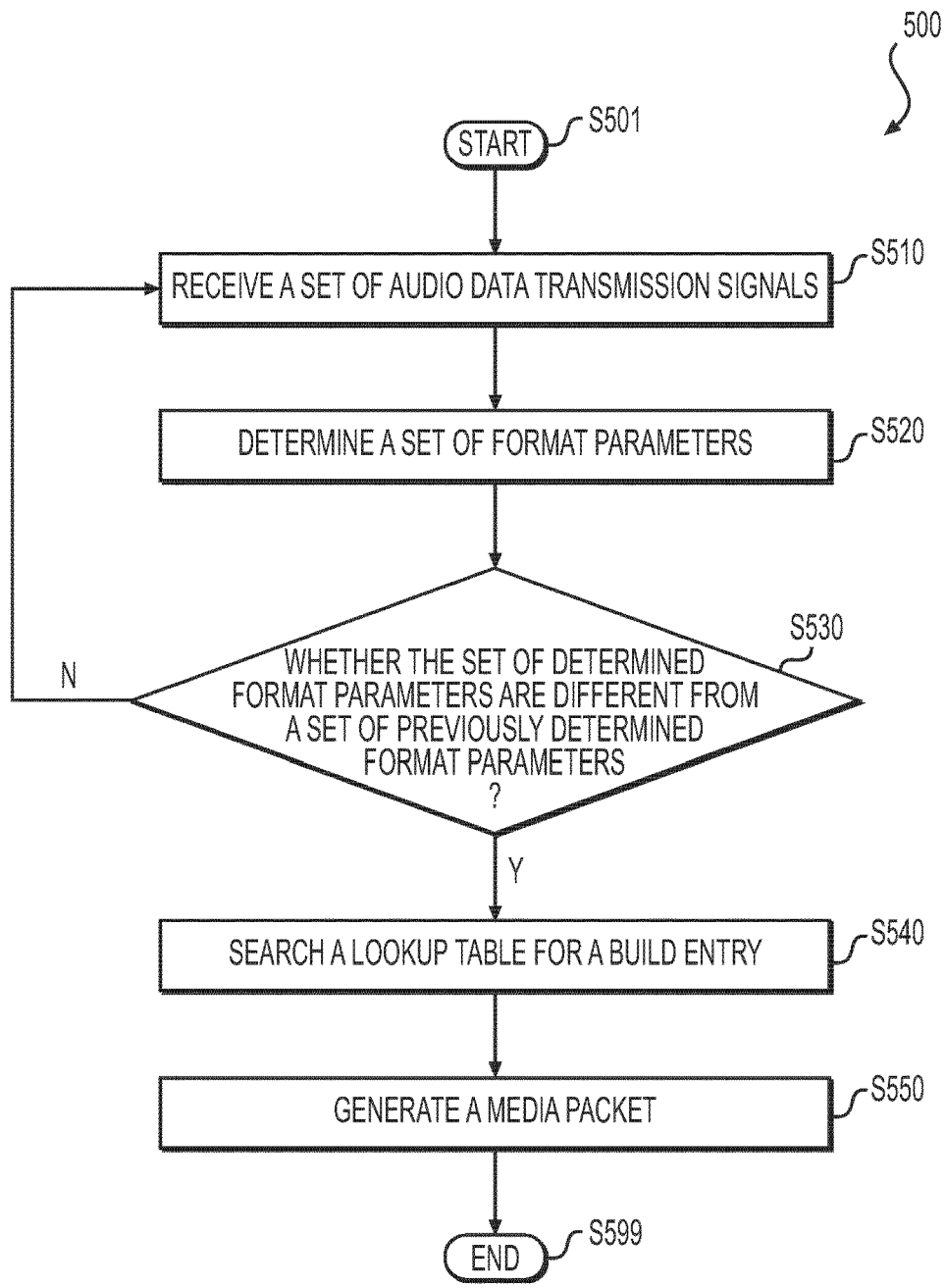
FIG. 5 shows a flowchart of a process for scattering audio streams according to an embodiment of the disclosure.

FIG. 5 shows a flowchart of a process 500 for scattering audio streams according to an embodiment of the disclosure. The process 500 can be performed by the source device 300 in FIG. 3. The process 500 starts at S501, and proceeds to S510.

At S510, a set of audio data transmission signals are received at an audio input interface of a source device. The set of audio data transmission signals carry input audio data with a certain format, and indicate the format of the input audio data. A copy or part of the data transmission signals are transmitted to a format monitor, and received at the format monitor. In one example, the audio data transmission signals include a frame clock signal, a bit clock signal, and an audio data signal carrying a sequence of audio data frames.

At S520, a set of format parameters are determined at the format monitor based on the received audio data transmission signals. The format parameters correspond to the format of the input audio data. For audio data with different formats, different set of format parameters can be determined. In one example, the format parameters include a sampling rate of the input audio data and a bit clock number per sampling period of the bit clock signal.

At S530, whether the set of format parameters determined at S520 are different from a set of previously determined format parameters is determined at the format monitor. When the set of format parameters determined at S520 are different from a set of previously determined format parameters, the set of format parameters are passed to a searching unit, and the process 500 proceeds to S540. Otherwise, the process 500 returns to S510.

At S540, a lookup table is searched to find a build entry that is identified by the set of format parameters determined at S520. The lookup table can include multiple build entries. Each build entry can include a set of packet generation parameters, such as a destination address of a destination device, a flow ID, a number of channel sections in a media packet, a media format of content in the payload of the media packet, a sample bit-width of audio samples carried by the media packet, channel mapping information for mapping input audio channels to respective channel sections, and the like. The generation parameters in the found entry are passed to a packet generator. In one example, when none of the build entries matches the set of format parameters determined at S520, no media packet is generated. Specifically, in FIG. 3 example, the searching unit 350 transmits a signal to the media packet generator 370 to stop the operation of generating media packets. In addition, in one example, the searching unit 350 may transmit another signal to the audio input interface 320 to stop operations of storing audio samples to the sample buffer 330.

At S550, media packets are generated according to the generation parameters determined at S540 at the packet generator. For example, the destination address in the determined packet generation parameters can be included in the media packets. Subsequently, the media packets can be transmitted to the respective destination device at the destination address. The packet generation parameters determined at S540 may be different from a set of previously determined generation parameters which may include a different destination address. Thus, the currently generated media packets may be transmitted to a destination device different from a destination device which the previously generated media packets were transmitted to. In this way, input audio data with different formats can be carried by different media streams transmitted to different destination devices. The process 500 proceeds to S599 and terminates at S599.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   receiving audio data transmission signals indicating a format of audio data possibly having at least a first format and a second format;
   determining a first set of format parameters corresponding to the first format of the audio data based on the received audio data transmission signals;
   storing the first set of format parameters in a memory;
   searching a lookup table for a first build entry identified by the first set of format parameters;
   generating, according to the first build entry, a first media packet carrying audio samples of the audio data of the first format;
   periodically obtaining a set of format parameters based on the received audio data transmission signals, and determining whether the obtained set of format parameters are different from the stored first set of format parameters;
   when a second set of format parameters corresponding to the second format of the audio data are obtained and determined to be different from the stored first set of format parameters, searching the lookup table for a second build entry identified by the second set of format parameters; and
   generating, according to the second build entry, a second media packet carrying audio samples of the audio data of the second format.

2. The method of claim 1, wherein the second set of format parameters corresponding to the second format of the audio data includes:
   a sampling rate of the audio data, and
   a number of bits transmitted during a sampling period in the set of audio data transmission signals.

3. The method of claim 1, wherein the audio data transmission signals indicating the format of the audio data includes:
   a frame clock signal indicating a sampling rate of the audio data, and
   a bit clock signal indicating a number of bits transmitted during a sampling period of the audio data.

4. The method of claim 1, wherein,
   the first build entry includes a first destination address for transmitting the first media packet to a first destination device,
   the second build entry includes a second destination address for transmitting the second media packet to a second destination device, and
   generating the second media packet includes including the second destination address in the second media packet for transmitting the second media packet to the second destination device at the second destination address.

5. The method of claim 1, wherein,
   the second build entry includes a flow identifier (ID) indicating a media packet flow transmitted to a destination device, and
   generating the second media packet includes including the flow ID in the second media packet.

6. The method of claim 1, wherein,
   the second build entry includes information specifying a stream format for content in a payload of the second media packet, and
   generating the second media packet includes generating the payload of the second media packet according to the stream format.

7. The method of claim 1, wherein the second build entry includes information specifying a number of channel sections in the second media packet and an audio sample bit-width of samples carried in the second media packet.

8. The method of claim 1, wherein,
   the second build entry includes information specifying a subset of audio channels of the audio data and a subset of channel sections in the second media packet for carrying audio samples of the subset of audio channels respectively, and generating the second media packet includes including the audio samples of the subset of audio channels of the audio data in the respective channel sections in the second media packet.

9. A circuit, comprising:
a memory configured to store a lookup table including one or more build entries;
a format monitor circuit configured to:
  receive audio data transmission signals indicating a format of audio data possibly having at least a first format and a second format,
  determine a first set of format parameters corresponding to the first format of the audio data based on the received audio data transmission signals,
  store the first set of format parameters in a memory,
  periodically obtain a set of format parameters based on the received audio data transmission signals, and determine whether the obtained set of determined format parameters are different from the stored first set of format parameters;
a searching unit circuit configured to:
  search the lookup table for a first build entry identified by the first set of format parameters, and
  search the lookup table for a second build entry identified by a second set of format parameters in response to the format monitor circuit obtaining the second set of format parameters corresponding to the second format of the audio data, and determining the second set of format parameters are different from the stored first set of format parameters; and
a packet generator circuit configured to:
  generate, according to the first build entry, a first media packet carrying audio samples of the audio data of the first format, and
  generate, according to the second build entry, a second media packet carrying audio samples of the audio data of the second format.

10. The circuit of claim 9, wherein the second set of format parameters corresponding to the second format of the audio data includes:
  a sampling rate of the audio data, and
  a number of bits transmitted during a sampling period in the set of audio data transmission signals.

11. The circuit of claim 9, wherein the audio data transmission signals indicating the format of the audio data includes:
  a frame clock signal indicating a sampling rate of the audio data, and
  a bit clock signal indicating a number of bits transmitted during a sampling period of the audio data.

12. The circuit of claim 9, wherein,
  the first build entry includes a first destination address for transmitting the first media packet to a first destination device,
  the second build entry identified by the second set of format parameters includes a second destination address for transmitting the second media packet to a second destination device, and
  the packet generator circuit is configured to include the second destination address in the second media packet for transmitting the second media packet to the second destination device.

13. The circuit of claim 9, wherein,
  the second build entry identified by the set of format parameters includes a flow identifier (ID) indicating a media packet flow transmitted to a destination device, and
  the packet generator circuit is configured to include the flow ID in the second media packet.

14. The circuit of claim 9, wherein,
  the second build entry identified by the second set of format parameters includes information specifying a stream format for content in a payload of the second media packet, and
  the packet generator circuit is configured to generate the payload of the second media packet according to the stream format.

15. The circuit of claim 9, wherein the second build entry identified by the second set of format parameters includes information specifying a number of channel sections in the second media packet and an audio sample bit-width of samples carried in the second media packet.

16. The circuit of claim 9, wherein,
  the second build entry identified by the second set of format parameters includes information specifying a subset of audio channels of the audio data and a subset of channel sections in the second media packet for carrying audio samples of the subset of audio channels respectively, and
  the packet generator circuit is configured to include the audio samples of the subset of audio channels of the audio data in the respective channel sections in the second media packet.

17. The circuit of claim 9, further comprising an audio input interface configured to:
  receive the audio data transmission signals, and
  transmit the received audio data transmission signals to the format monitor circuit.

18. A device, comprising:
a memory configured to store a lookup table including one or more build entries;
a format monitor circuit configured to,
  receive audio data transmission signals indicating a format of audio data possibly having at least a first format and a second format,
  determine a first set of format parameters corresponding to the first format of the audio data based on the received audio data transmission signals,
  store the first set of format parameters in a memory,
  periodically obtain a set of format parameters based on the received audio data transmission signals, and determine whether the obtained set of determined format parameters are different from the stored first set of format parameters;
a searching unit circuit configured to:
  search the lookup table for a first build entry identified by the first set of format parameters, and
  search the lookup table for a second build entry identified by a second set of format parameters in response to the format monitor circuit obtaining the second set of format parameters corresponding to the second format of the audio data, and determining the second set of format parameters are different from the stored first set of format parameters;
a packet generator circuit configured to:
  generate, according to the first build entry, a first media packet carrying audio samples of the audio data of the first format, and
  generate, according to the second build entry, a second media packet carrying audio samples of the audio data of the second format;
a switch unit configured to transmit the first or second media packet to a first or second destination device, respectively; and a central processing unit (CPU) configured to execute program instructions to configure the lookup table.

19. The device of claim 18, wherein the audio data transmission signals indicating the format of the audio data includes:
a frame clock signal indicating a sampling rate of the audio data, and
a bit clock signal indicating a number of bits transmitted during a sampling period of the audio data.

20. The device of claim 19, wherein,
the first build entry identified by the first set of format parameters includes a first destination address for transmitting the first media packet to a first destination device,
the second build entry identified by the second set of format parameters includes a second destination address for transmitting the second media packet to a second destination device, and
the packet generator circuit is configured to include the second destination address in the second media packet for transmitting the second media packet to the second destination device.

\* \* \* \* \*